US012738143B2

(12) United States Patent
Meah et al.

(10) Patent No.: US 12,738,143 B2
(45) Date of Patent: Sep. 15, 2026

(54) BRIDGE DEVICE

(71) Applicant: Tyco Fire & Security GmbH, Neuhausen am Rheinfall (CH)

(72) Inventors: Faruk Meah, Sunbury-on-Thames (GB); Timothy Andrew James, Harrow (GB); Steven Bennett, Sunbury-on-Thames (GB); Robert Feltham, Fort Lauderdale, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 19 days.

(21) Appl. No.: 18/761,038

(22) Filed: Jul. 1, 2024

(65) Prior Publication Data

US 2025/0014443 A1 Jan. 9, 2025

(30) Foreign Application Priority Data

Jul. 3, 2023 (GB) ...................................... 2310173

(51) Int. Cl.
*G08B 21/18* (2006.01)
*H04L 12/46* (2006.01)
*H04L 69/04* (2022.01)

(52) U.S. Cl.
CPC .......... *G08B 21/18* (2013.01); *H04L 12/4625* (2013.01); *H04L 69/04* (2013.01)

(58) Field of Classification Search
CPC . G07C 5/008; G07C 3/02; G07C 1/00; G07C 3/00; G07C 5/00; G07C 7/00; G07C 9/00; G07C 11/00; G07C 13/00; H04L 67/12; H04L 12/40; H04L 2012/40267; H04L 63/14; H04L 63/1416; H04L 1/004; H04L 1/0045; H04L 1/0057; H04L 1/0071; H04L 1/24; H04L 12/10; H04L 12/12; H04L 12/2801; H04L 12/44; H04L 2001/0093; H04L 2027/0036; H04L 2027/0057; H04L 2027/0067;
(Continued)

(56) References Cited

U.S. PATENT DOCUMENTS 7,539,142 B1 * 5/2009 Gurley ................ H04L 12/4625 370/428
11,210,927 B2 12/2021 Kybarshi et al.
(Continued)

FOREIGN PATENT DOCUMENTS

GB 2538835 A 11/2016
WO 9502926 A1 1/1995

OTHER PUBLICATIONS

Extended European Search Report issued in corresponding European Application No. EP 24 18 5164 dated Dec. 3, 2024.
(Continued)

*Primary Examiner* — Daniel Previl
(74) *Attorney, Agent, or Firm* — ArentFox Schiff LLP

(57) ABSTRACT

The present invention provides a bridge device which allows for communication between two external devices (e.g. an initiating device and a control device) which use different first and second data encoding schemes, without the need to modify either of the devices. In particular, the bridge device has two communication interfaces which can communicate with the respective external devices, and a processor which can translate data from the first data encoding scheme to the second data encoding scheme, and vice versa.

20 Claims, 6 Drawing Sheets

(58) Field of Classification Search

CPC ........... H04L 25/03866; H04L 27/2601; H04L 27/2614; H04L 27/2631; H04L 27/2634; H04L 27/2647; H04L 27/2652; H04L 27/26524; H04L 27/2654; H04L 27/2655; H04L 27/2657; H04L 27/2662; H04L 27/34; H04L 41/0213; H04L 41/064; H04L 41/0896; H04L 43/00; H04L 43/022; H04L 43/067; H04L 43/0811; H04L 43/0817; H04L 43/0823; H04L 43/0829; H04L 43/0847; H04L 43/0852; H04L 43/0858; H04L 43/0864; H04L 43/0882; H04L 43/16; H04L 5/0007; H04L 5/0037; H04L 5/0044; H04L 5/023; H04L 5/14; H04L 5/143; H04L 5/1484; H04L 12/4625; H04L 69/04; H04L 9/0861; H04L 9/3226; H04L 9/50; B60K 31/00; B60K 31/18; B60Y 2200/11; B60Y 2200/12; B60Y 2200/126; B60Y 2200/13; B60Y 2200/30; B60Y 2200/40; B60Y 2200/50; B60Y 2200/90; G06Q 2240/00; G06Q 30/0207; G06Q 30/0282; G06Q 30/08; G06Q 20/02; G06Q 20/367; G06Q 20/38215; G06Q 20/3827; G06Q 20/385; G06Q 2220/00; G06Q 30/0201; G06Q 30/0251; G08G 1/00; G08G 1/096716; G08G 1/096725; G08G 1/096775; G08G 1/164; G08G 1/205; Y04S 40/18; Y04S 40/20; Y04S 10/00; Y04S 30/00; Y04S 20/00; Y04S 50/00; Y04S 40/00; G05B 19/042; G06F 11/3006; G06F 11/3027; G06F 11/3051; G06F 17/14; G06F 17/142; G06F 16/9538; G06F 16/9577; G06F 40/58; G06N 3/0464; G06N 3/08; G06N 3/09; G07F 17/32; G07F 17/323; G07F 17/3237; H03M 13/1515; H03M 13/356; H04B 10/272; H04H 20/69; H04H 20/77; H04H 20/78; H04H 20/79; H04H 20/80; H04H 60/11; H04H 60/86; H04H 60/96; H04H 60/97; H04J 14/0298; H04J 3/14; H04K 1/00; H04K 3/226; H04K 3/255; H04M 7/006; H04M 9/027; H04N 21/2221; H04N 21/2383; H04N 21/2385; H04N 21/2402; H04N 21/4382; H04N 21/6118; H04N 21/6137; H04N 21/6168; H04N 7/17309; H04N 7/22; H04W 24/00; H04W 24/08; Y02D 30/50; G05D 1/0287; G08B 21/18; G08B 21/02; G08B 25/016; G08B 6/00; A44C 9/0023; A44C 9/0038; A61B 5/6805; A61B 5/747; A61N 1/025; A61N 1/36021; F21K 9/232; F21K 9/233; F21K 9/235; F21K 9/237; F21K 9/238; F21V 23/005; F21V 23/0442; F21V 29/70; F21V 5/04; F21V 7/06; F21V 9/30; F21Y 2107/90; F21Y 2115/10; F41H 1/00; H02H 3/26; H05B 45/375; H05B 47/26; H05B 47/28; H05K 2201/10106; H05K 3/366; H05K 1/00; H05K 3/00; H05K 5/00; H05K 7/00; H05K 9/00; H05K 10/00; H05K 11/00; H05K 13/00; H05K 2201/00; H05K 2203/00

USPC ......... 340/540, 506, 501, 693.1, 525, 545.2, 340/545.3, 545.4, 551, 555–557, 561, 567

See application file for complete search history.

(56) References Cited

U.S. PATENT DOCUMENTS

| | | | | |
|---|---|---|---|---|
| 2007/0241875 | A1* | 10/2007 | Costa | G08B 29/24 340/506 |
| 2016/0100437 | A1* | 4/2016 | Armstrong | G05B 19/4185 370/249 |
| 2016/0249395 | A1* | 8/2016 | Logue | H04L 67/54 |
| 2017/0257173 | A1* | 9/2017 | Harris | H04B 10/07953 |
| 2018/0312225 | A1* | 11/2018 | Peleg | B63B 27/36 |
| 2022/0014383 | A1* | 1/2022 | Duncan | H04L 63/126 |
| 2022/0077875 | A1* | 3/2022 | He | H04L 1/0064 |

OTHER PUBLICATIONS

Combined Search and Examination Report issued in corresponding GB Application No. GB2310173.6 dated Nov. 29, 2023.

Simplex, "Fire Alarm Network Reference, Physical Bridge Modules for 4120 Network", S4100-0057, Rev. 8, Available Online at <https://docs.johnsoncontrols.com/simplex/api/khub/documents/SLEJ8rlSViRRtKQ_0JnQgg/content>, Nov. 2020, pp. 1-6.

MSA, "Fire Alarm-to-SCADA Integration: A Roadmap to Fast, Cost-Effective Connection", An MSA FieldServer White Paper, 0700-167-MC, Jun. 2021, 5 pages.

Simplex, "Fire Control Panel Accessories, 4120 Network TCP/IP Physical Bridge Modules for 4100ES, 4010ES, 4100U, and 4100 Fire Alarm Control Panels", www.simplex-fire.com, S4100-0029-12, May 2018, pp. 1-6.

Honeywell, "WIDP-WGI, Swift® Wireless Gateway", Farenhyt™ Series, Honeywell International Inc., 2018, pp. 1-4.

* cited by examiner

BRIDGE DEVICE

CROSS-REFERENCE TO RELATED APPLICATION(S)

This application claims priority to UK Patent Application No. 2310173.6, filed Jul. 3, 2023, the contents of which are hereby incorporated by reference herein in the entirety.

FIELD OF INVENTION

The present invention relates to a bridge device which enables communication between devices that use different data encoding schemes.

BACKGROUND

Hazard detection systems, such as fire detection systems, may include many types of devices which need to communicate with one another. When data is transmitted from one device to another, the data may be encoded using a particular data encoding scheme.

SUMMARY OF INVENTION

Various types of data encoding schemes exist for transmitting data between devices in hazard detection systems. Issues may arise in situations where it is desired to add a device which uses a particular data encoding scheme to a system which uses a different data encoding scheme. In such situations, the device will not be able to communicate directly with devices within the system, and it may be therefore be necessary to modify the device to be compatible with the data encoding scheme used by the system, or even produce a completely new version of the device. However, this may require significant time and resources. It may also take time for a new version of the device to approved by the appropriate regulatory authorities, leading to a delay in the device being implemented in the system.

The present invention addresses the above issues by providing a bridge device which allows for communication between two external devices (e.g. an initiating device and a control device) which use different first and second data encoding schemes, without the need to modify either of the devices. In particular, the bridge device has two communication interfaces which can communicate with the respective external devices, and a processor which can translate data from the first data encoding scheme to the second data encoding scheme, and vice versa.

According to an aspect of the present invention, there is provided a bridge device comprising:

- a first communication interface configured to communicate with an initiating device that is compatible with a first data encoding scheme;
- a second communication interface configured to communicate with a control device that is compatible with a second data encoding scheme; and
- a processor configured to:
- receive, from the initiating device via the first communication interface, first data encoded using the first data encoding scheme, re-encode the first data using the second data encoding scheme, and transmit the re-encoded first data to the control device via the second communication interface; and
- receive, from the control device via the second communication interface, second data encoded using the second data encoding scheme, re-encode the second data using the first data encoding scheme, and transmit the re-encoded second data to the initiating device via the first communication interface.

The first data encoding scheme may encode data as a square wave.

The second data encoding scheme may encode data as a sine wave.

The second data encoding scheme may encode data as a sine wave using a frequency modulation scheme. The frequency modulation scheme may be a frequency shift keying (FSK) modulation scheme.

The first data may comprise status data for the initiating device.

The status data may indicate that an alarm condition has been detected by the initiating device.

The second data may comprise control data configured to control the initiating device.

According to another aspect of the present invention, there is provided a system comprising:

- a bridge device as set out above;
- an initiating device that is compatible with the first data encoding scheme; and
- a control device that is compatible with the second data encoding scheme.

The initiating device may be a call point.

The control device may be a control panel.

The system may further comprise a loop. The control device may be connected to the loop. The bridge device may be connected to the loop via the second communication interface. The bridge device may be configured to communicate with the control device via the loop.

According to another aspect of the present invention, there is provided a method comprising:

- receiving, from an initiating device that is compatible with a first data encoding scheme, data encoded using the first data encoding scheme;
- re-encoding the received data using a second data encoding scheme; and
- transmitting the re-encoded data to a control device, wherein the control device is compatible with the second data encoding scheme.

According to another aspect of the present invention, there is provided a method comprising:

- receiving, from a control device that is compatible with a second data encoding scheme, data encoded using the second data encoding scheme;
- re-encoding the received data using a first data encoding scheme; and
- transmitting the re-encoded data to an initiating device, wherein the initiating device is compatible with the first data encoding scheme.

BRIEF DESCRIPTION OF THE DRAWINGS

The present disclosure will now be described by way of example only with reference to the accompanying drawings, in which.

DETAILED DESCRIPTION

Figure 1:
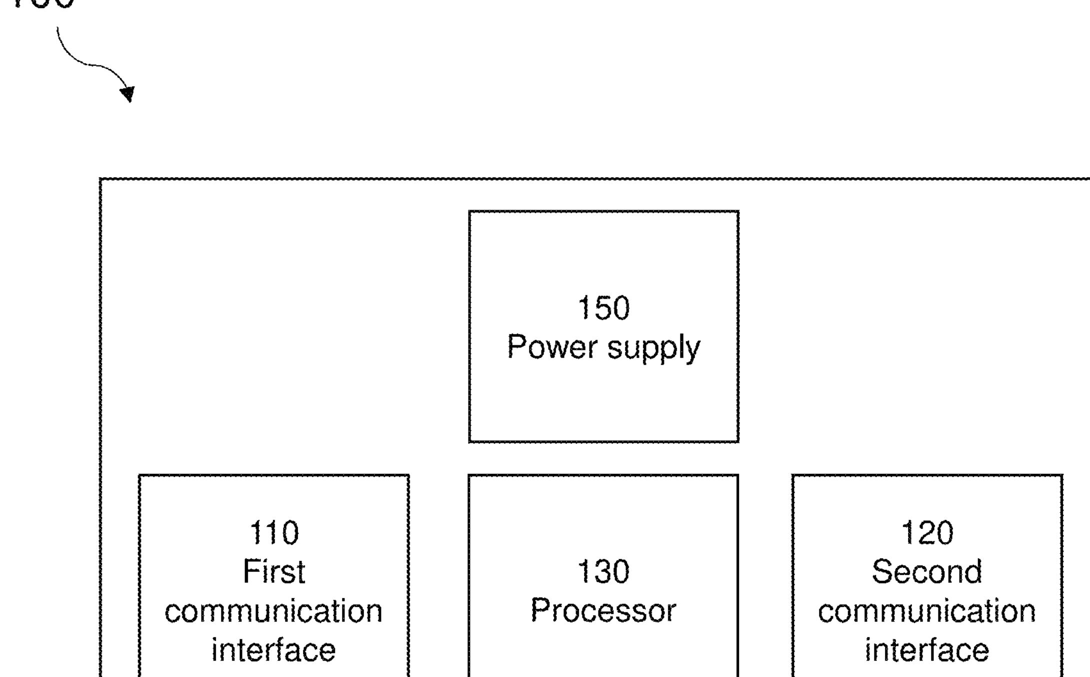
FIG. 1 is a block diagram showing an example of a bridge device according to an embodiment.

FIG. 1 shows an example of a bridge device which allows for communication between devices that use different data encoding schemes.

The bridge device 100 includes a first communication interface 110 and a second communication interface 120. The first communication interface 110 is configured to communicate with an initiating device (not shown) that is compatible with a first data encoding scheme. The first data encoding scheme may involve encoding data as a square wave, e.g. a square wave current signal. The first communication interface 110 can send/receive data encoded using the first data encoding scheme to/from the initiating device. The initiating device may be, for example, an on-premise fire protection device such as a smoke detector, a manual pull station, a manual call point, a waterflow switch, a sprinkler supervisory switch, or any other device configured for initiating a fire or other safety alarm by detecting a safety or fire condition.

The second communication interface 120 is configured to communicate with a control device (e.g. a control panel), that is compatible with a second data encoding scheme different from the first data encoding scheme. The second data encoding scheme may involve encoding data as a sine wave, e.g. a sine wave current signal. The second data encoding scheme may be, for example, a frequency modulation scheme such as a frequency shift keying (FSK) modulation scheme. The second communication interface 120 can send/receive data encoded using the second data encoding scheme to/from the control device.

The bridge device 100 further includes a processor 130 which is connected to both the first communication interface 110 and the second communication interface 120. The processor 130 may be, for example, an application specific integrated circuit (ASIC).

The processor 130 is configured to receive data from the initiating device via the first communication interface 110. These data may be encoded using the first data encoding scheme. The processor 130 is configured to re-encode the data using the second data encoding scheme and transmit the re-encoded data to the control device via the second communication interface 120. Hence, the bridge device 100 enables the transmission of data from an initiating device to a control device, despite the initiating device and the control device using different data encoding schemes. Data transmitted by the initiating device may include status data for the initiating device. Such status data may indicate, for example, that a fire condition has been detected by the initiating device. The bridge device 100 allows these status data to be communicated to the control device.

Alternatively, or in addition, the processor 130 is configured to receive data from the control device via the second communication interface 120. These data may be encoded using the second data encoding scheme. The processor 130 is configured to re-encode the data using the first data encoding scheme and transmit the re-encoded data to the initiating device via the first communication interface 110. Hence, the bridge device 100 enables the transmission of data from a control device to an initiating device, despite the control device and the initiating device using different data encoding schemes. Data transmitted by the control device may include control data for the initiating device. Such control data may, for example, control the initiating device to reset its status. The bridge device 100 allows these control data to be communicated to the initiating device.

The bridge device 100 also includes a memory 140. The memory 140 may be, for example, random-access memory (RAM) or a cache memory. The memory 140 can store data for processing (e.g. encoding) by the processor 130, such as data received from the initiating device or the control device. For example, the memory 140 may store status data received from the initiating device which is then re-encoded by the processor 130 and transmitted to the control device.

The bridge device 100 also includes a power supply 150 which is configured to supply power to the various components of the bridge device 100, such as the first communication interface 110, the second communication interface 120 and the processor 130.

Figure 2A:
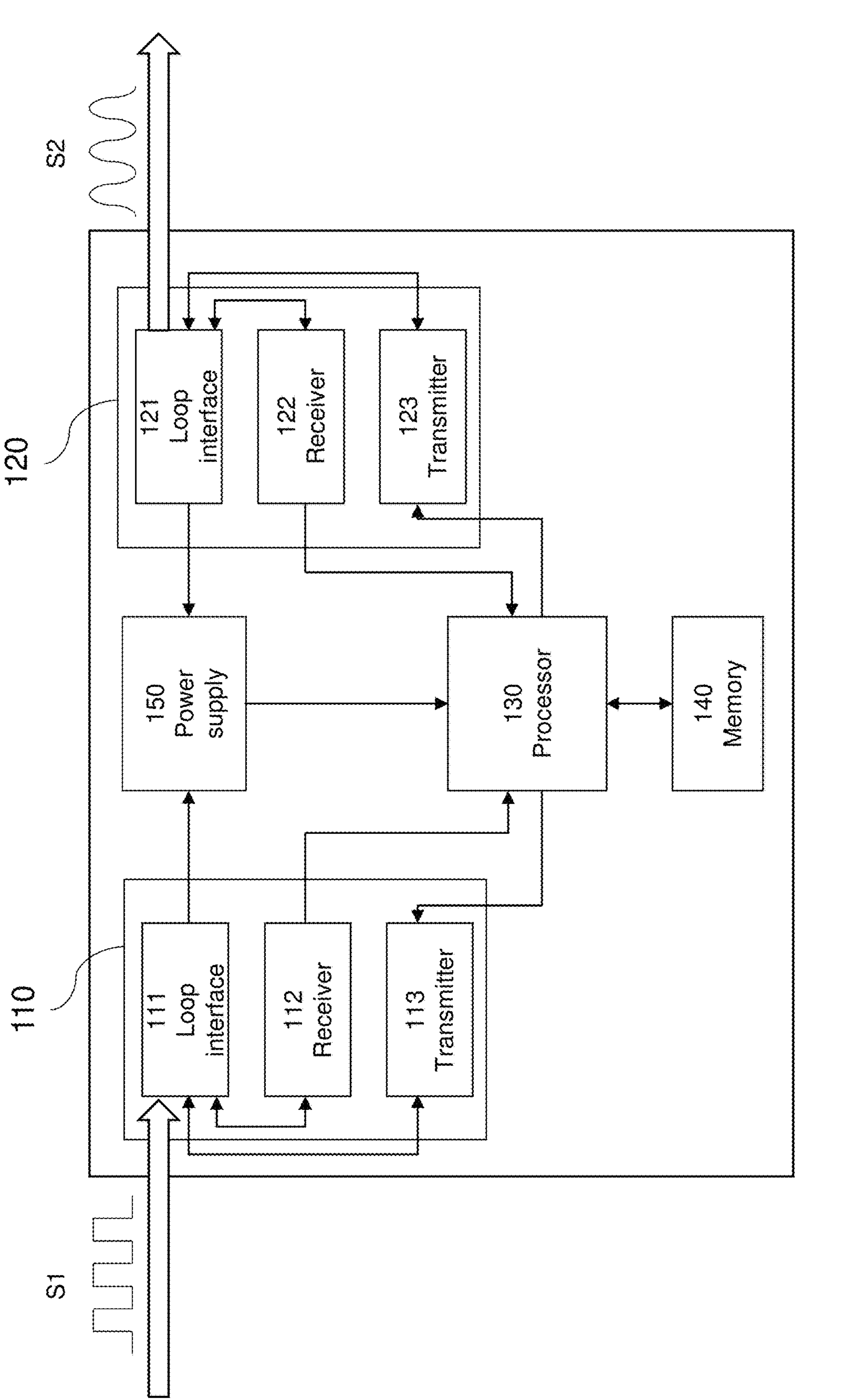
FIGS. 2A and 2B are block diagrams showing an example of the bridge device shown in FIG. 1.
Figure 2B:
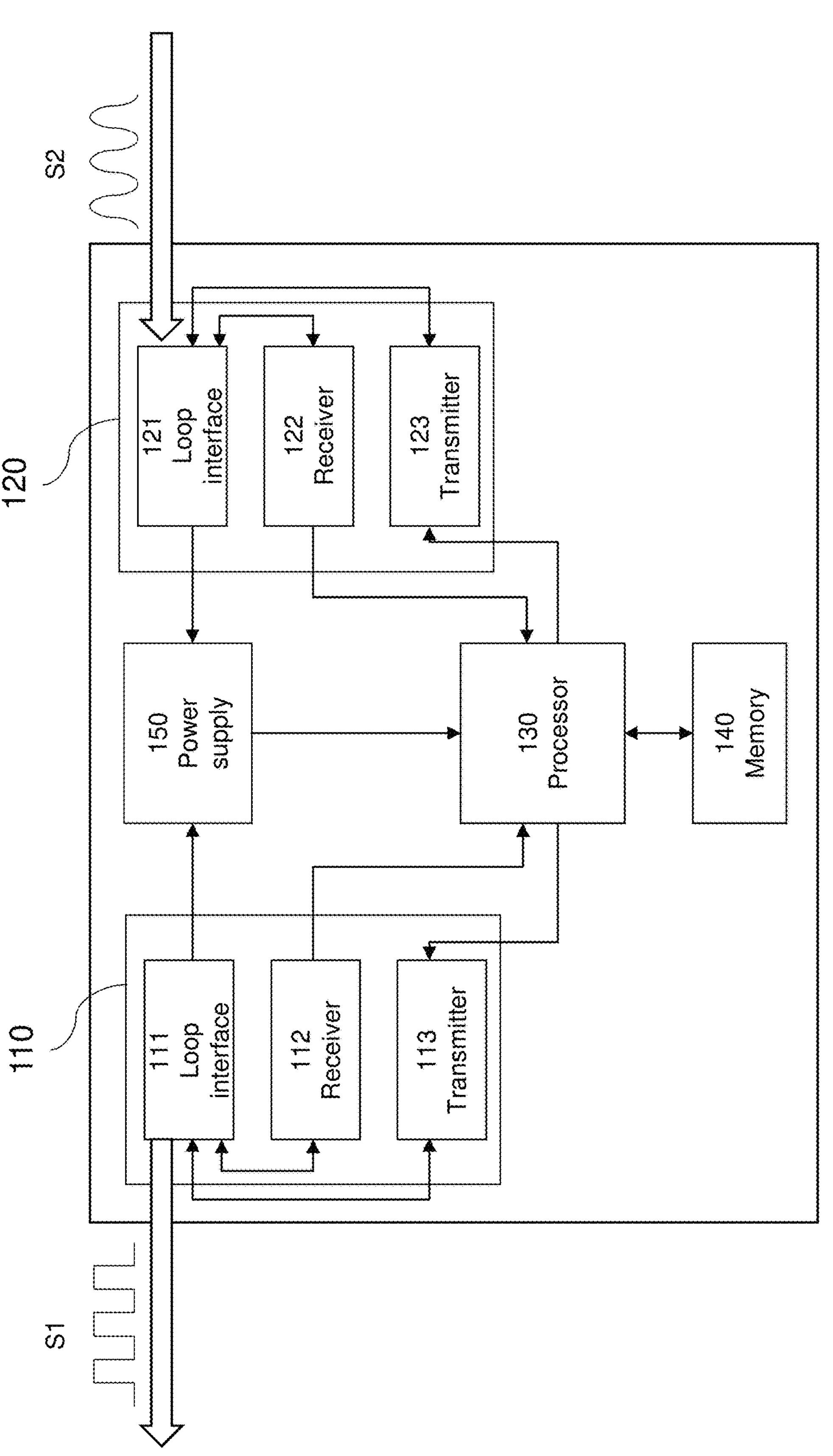

FIGS. 2A and 2B show an example of the bridge device 100 of FIG. 1. As shown in FIGS. 2A and 2B, the first communication interface 110 includes a first loop interface 111 which is configured to be connected to the initiating device (not shown). The first communication interface 110 also includes a first receiver 112 and a first transmitter 113 which receive and transmit data from/to the initiating device respectively.

The second communication interface 120 includes a second loop interface 121 which is configured to be connected to the control device (not shown). The second communication interface 120 also includes a second receiver 122 and a second transmitter 123 which receive and transmit data from/to the control device respectively.

As shown in FIG. 2A, the processor 130 can receive data from the initiating device which is encoded as a square wave current pulse S1. The processor 130 re-encodes the data as a sine wave current pulse, in the present case using frequency shift keying. The sine wave current pulse S2 can be transmitted to the control device via the second transmitter 123 and the second loop interface 121.

Further, as shown in FIG. 2B, the processor 130 can receive data from the control device which is encoded as a sine wave current pulse S2, in the present case using frequency shift keying. The processor 130 re-encodes the data as a square wave current pulse. The square wave current pulse S1 can be transmitted to the initiating device via the first transmitter 113 and the first loop interface 111.

Figure 3:
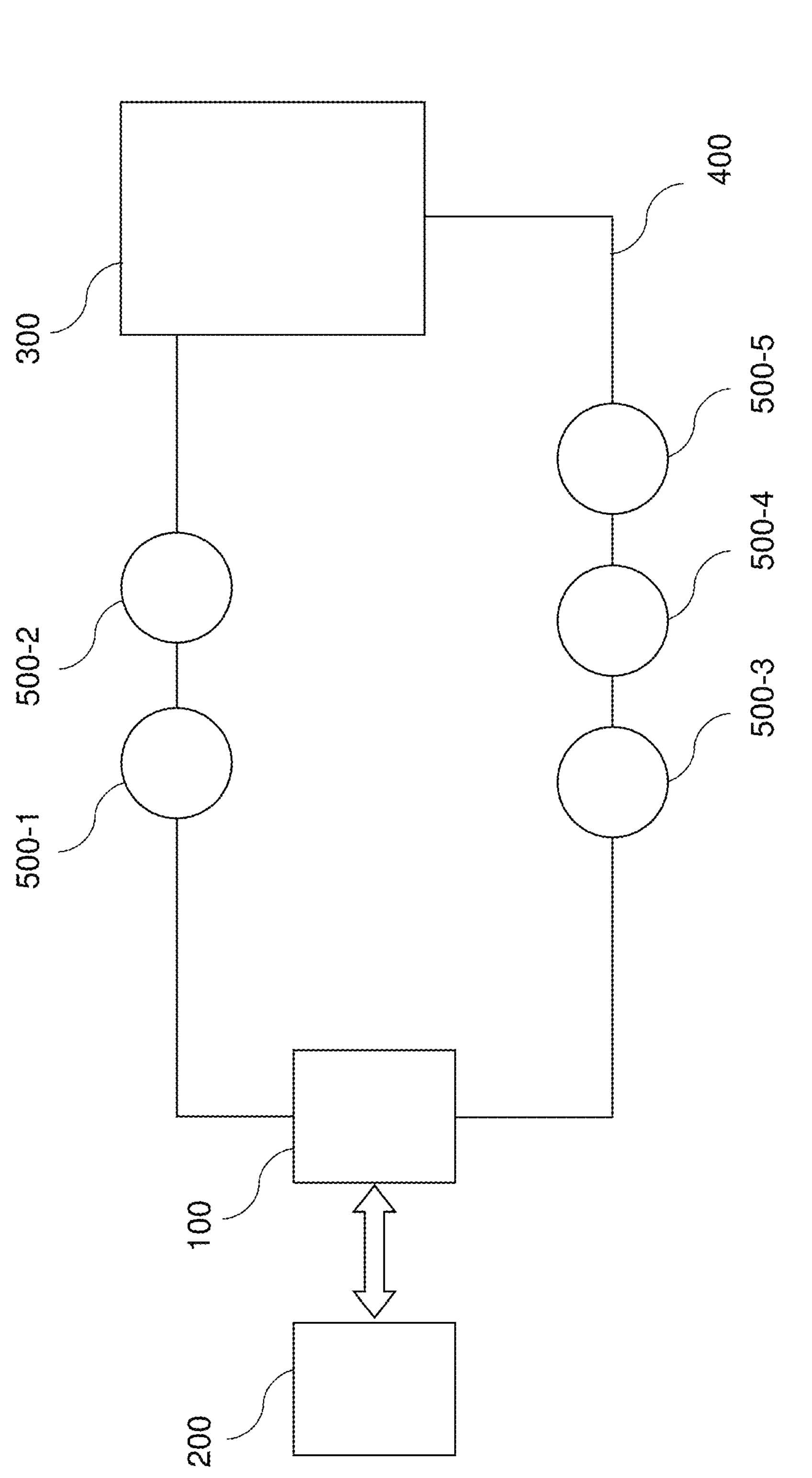
FIG. 3 is a diagram showing an example of a hazard detection system according to an embodiment.

FIG. 3 shows an example of hazard detection system incorporating a bridge device according to the disclosure.

The system includes a control panel 300, that in the present example is connected to a loop 400. The loop 400 may include one or more control lines (not shown). Various loop devices 500-1 to 500-5 are connected to the loop 400 and can communicate with the control panel 300 via the loop 400. In the present example, a single loop is shown, but it should be appreciated that in other examples a system may include multiple loops, with each loop connecting one or more loop devices to the control panel.

The loop devices 500 may include, for example, detector units, sounder units, strobe indicator units or alarm activation units. In the present example, the loop devices 500 communicate with the control panel 300 using a frequency shift keying encoding scheme.

A bridge device 100 is connected to the loop 400 and can communicate with the control panel 300 via the loop 400. The bridge device 100 can also communicate with a call point 200. The bridge device 100 allows the call point 200 to report its status to the control panel 300, despite the call point 200 and the control panel 300 using different encoding schemes. From the control panel's perspective, the call point 200 appears as another device on the loop 400 in a similar way to the loop devices 500, which are directly connected to the loop 400.

Figure 4:
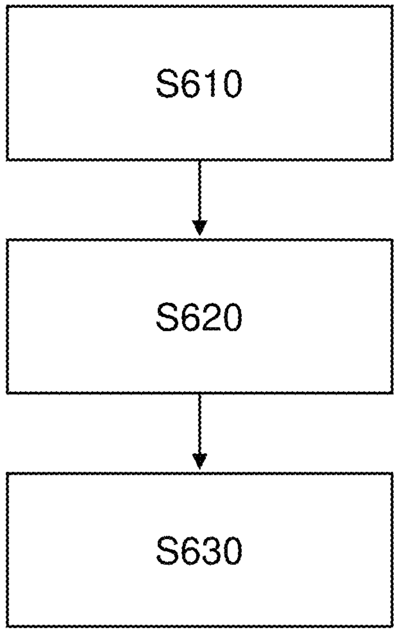
FIG. 4 is a flow chart showing an example of a method according to an embodiment.

FIG. 4 shows an example of a method which may be performed by any of the bridge devices described herein, such as the bridge device 100 described above in relation to FIG. 1. The method includes receiving, from an initiating device that is compatible with a first data encoding scheme, data encoded using the first data encoding scheme (S610); re-encoding the received data using a second data encoding scheme (S620); and transmitting the re-encoded data to a control device which is compatible with the second data encoding scheme (S630).

Figure 5:
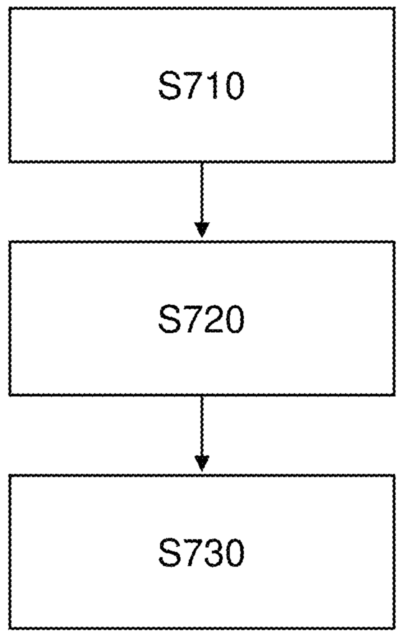
FIG. 5 is a flow chart showing an example of a method according to an embodiment.

FIG. 5 shows an example of a method which may be performed by any of the bridge devices described herein, such as the bridge device 100 described above in relation to FIG. 1. The method includes receiving, from a control device that is compatible with a second data encoding scheme, data encoded using the second data encoding scheme (S710); re-encoding the received data using a first data encoding scheme (S720); and transmitting the re-encoded data to an initiating device which is compatible with the first data encoding scheme (S730).

It should be appreciated that the methods shown in FIGS. 4 and 5 may be implemented in combination. For example, steps S610-S630 shown in FIG. 4 may be followed by steps S710-S730 shown in FIG. 5.

As used herein, the term "processor" describes circuitry that performs a function, an operation, or a sequence of operations. The function, operation, or sequence of operations can be hard coded into the circuitry or soft coded by way of instructions held in a memory device and executed by the circuitry. A "processor" can perform the function, operation, or sequence of operations using digital values and/or using analog signals. In some embodiments, the "processor" can be embodied in one or more ASICs, microprocessors, digital signal processors (DSPs), microcontrollers, field programmable gate arrays (FPGAs), programmable logic arrays (PLAs), multi-core processors, or general-purpose computers with associated memory. In some embodiments, the "processor" can be one or more physical processors, or one or more "virtual" (e.g., remotely located or "cloud") processors. A processor including multiple processor cores and/or multiple processors can provide functionality for parallel, simultaneous execution of instructions or for parallel, simultaneous execution of one instruction on more than one piece of data.

Various further modifications to the above described examples, whether by way of addition, deletion or substitution, will be apparent to the skilled person to provide additional examples, any and all of which are intended to be encompassed by the appended claims.

The invention claimed is:

1. A bridge device for use in a hazard detection system that comprises a loop, the bridge device comprising:

a first communication interface configured to communicate with an initiating device of the hazard detection system, wherein the initiating device is compatible with a first data encoding scheme;

a second communication interface configured to connect to the loop of the hazard detection system and communicate with a control device of the hazard detection system via the loop of the hazard detection system, wherein the control device is connected to the loop of the hazard detection system and is compatible with a second data encoding scheme; and a processor configured to:

receive, from the initiating device via the first communication interface, first data encoded using the first data encoding scheme, re-encode the first data using the second data encoding scheme, and transmit the re-encoded first data to the control device via the second communication interface; and receive, from the control device via the second communication interface, second data encoded using the second data encoding scheme, re-encode the second data using the first data encoding scheme, and transmit the re-encoded second data to the initiating device via the first communication interface.

2. The bridge device of claim 1, wherein the first data encoding scheme encodes data as a square wave.

3. The bridge device of claim 1, wherein the second data encoding scheme encodes data as a sine wave.

4. The bridge device of claim 1, wherein the second data encoding scheme encodes data as a sine wave using a frequency modulation scheme, wherein the frequency modulation scheme is a frequency shift keying (FSK) modulation scheme.

5. The bridge device of claim 1, wherein the first data comprises status data for the initiating device.

6. The bridge device of claim 5, wherein the status data indicate that an alarm condition has been detected by the initiating device.

7. The bridge device of claim 1, wherein the second data comprises control data configured to control the initiating device.

8. The bridge device of claim 1, wherein the hazard detection system further comprises one or more loop devices connected to the loop, wherein the one or more loop devices include one or more detector units, sounder units, strobe indicator units, and/or alarm activation units.

9. A hazard detection system comprising:

a loop;

a bridge device;

an initiating device that is compatible with a first data encoding scheme; and a control device that is compatible with a second data encoding scheme, wherein the bridge device comprises:

a first communication interface configured to communicate with the initiating device of the hazard detection system;

a second communication interface configured to connect to the loop of the hazard detection system and communicate with the control device of the hazard detection system via the loop of the hazard detection system, wherein the control device is connected to the loop of the hazard detection system; and a processor configured to:

receive, from the initiating device via the first communication interface, first data encoded using the first data encoding scheme, re-encode the first data using the second data encoding scheme, and transmit the re-encoded first data to the control device via the second communication interface; and receive, from the control device via the second communication interface, second data encoded using the second data encoding scheme, re-encode the second data using the first data encoding scheme, and transmit the re-encoded second data to the initiating device via the first communication interface.

10. The hazard detection system of claim 9, wherein the initiating device is a call point.

11. The hazard detection system of claim 9, wherein the control device is a control panel.

12. The hazard detection system of claim 9, further comprising one or more loop devices connected to the loop, wherein the one or more loop devices include one or more detector units, sounder units, strobe indicator units, and/or alarm activation units.

13. A method performed by a bridge device in a hazard detection system that comprises a loop, the method comprising:

receiving, by a first communication interface of the bridge device, from an initiating device of the hazard detection system, first data encoded using a first data encoding scheme, wherein the initiating device is compatible with the first data encoding scheme;

re-encoding the first data using a second data encoding scheme; and transmitting, by a second communication interface of the bridge device, the re-encoded first data to a control device of the hazard detection system via the loop of the hazard detection system, wherein the control device is connected to the loop of the hazard detection system and is compatible with the second data encoding scheme.

14. The method of claim 13, further comprising:

receiving, from the control device of the hazard detection system, second data encoded using the second data encoding scheme;

re-encoding the second data using the first data encoding scheme; and transmitting the re-encoded second data to the initiating device of the hazard detection system.

15. The method of claim 14, wherein the first data encoding scheme encodes data as a square wave.

16. The method of claim 14, wherein the second data encoding scheme encodes data as a sine wave.

17. The method of claim 14, wherein the second data encoding scheme encodes data as a sine wave using a frequency modulation scheme.

18. The method of claim 17, wherein the frequency modulation scheme is a frequency shift keying (FSK) modulation scheme.

19. The method of claim 14, wherein the first data comprises status data for the initiating device, wherein the status data indicates that an alarm condition has been detected by the initiating device, wherein the second data comprises control data configured to control the initiating device.

20. The method of claim 13, wherein the hazard detection system further comprises one or more loop devices connected to the loop, wherein the one or more loop devices include one or more detector units, sounder units, strobe indicator units, and/or alarm activation units.

* * * * *